UNITED STATES PATENT OFFICE.

LAWRENCE E. BARRINGER, OF SCHENECTADY, NEW YORK, ASSIGNOR TO GENERAL ELECTRIC COMPANY, A CORPORATION OF NEW YORK.

INSULATING MATERIAL.

1,091,621. Specification of Letters Patent. Patented Mar. 31, 1914.

No Drawing. Application filed November 21, 1910. Serial No. 593,387.

*To all whom it may concern:*

Be it known that I, LAWRENCE E. BARRINGER, a citizen of the United States, residing at Schenectady, county of Schenectady, State of New York, have invented certain new and useful Improvements in Insulating Material, of which the following is a specification.

My invention relates to insulating compositions and their production and involves particularly flexible insulations for electrical coils as in dynamo electric machines, transformers, and so forth.

My novel insulating material comprises a composition made by a novel process of a condensation product of a phenol and an aldehyde, such as formic aldehyde, and pitch derived from the distillation of fatty substances, for example, the viscid residue remaining in the form of an imperfectly formed soap from the distillation of crude oil with an alkali.

Two prominent advantages of my improved insulation are: first, its property of maintaining its resistivity, and in some cases even increasing in resistance, with a rise of temperature; second, its continued flexibility.

Both the condensation products and the above described pitches are well known and may be bought in the open market. The pitches are commercially designated by various names, for instance, stearin (or cotton oil) pitch, wool oil pitch, palm pitch, the two first-named representing residues containing mainly stearic, the third of palmitic acid. These two materials are indistinguishably mixed in accordance with my invention by being dissolved in a common solvent such as amyl acetate. This solution forms a varnish which can be applied to the electrical coils or can be used for impregnating cambric or other fibrous materials in order to improve their insulating property or in any other well understood manner.

The particular proportions of the condensation product and the pitch, of course, will vary somewhat in accordance with the property desired in the final product, but the following example will indicate in general the proportions desirable for a coated sheet insulation. About 50 parts by weight of the dry solid initial condensation product are mixed with approximately 30 parts stearin pitch and dissolved in 200 parts of amyl acetate by grinding these materials together, or otherwise agitating them in contact with the solvent. Stearin pitch is the residue remaining from the purification of crude cotton seed oil by caustic soda, and as indicated above this substance is chemically in the nature of an imperfectly formed soap. A sheet of cambric coated with this varnish was found to have its insulating resistance increased with a rise of temperature up to 75° C. The insulation as described above retains its flexibility while cambric varnished with linseed oil and similar forms of insulation become brittle after a certain length of time.

What I claim as new and desire to secure by Letters Patent of the United States, is,—

1. An insulating material containing a phenolic condensation product and a pitch remaining from the distillation of a fatty substance while in contact with alkali.

2. An insulating material containing a phenolic condensation product and stearin pitch.

3. An insulating material containing a phenolic condensation product and stearin pitch dissolved in amyl acetate.

4. An insulating material containing a phenolic condensation product and the pitchy residue remaining from the purification of crude cotton seed oil by caustic soda.

5. An insulating material comprising a sheet of fibrous material impregnated with a mixture of a phenolic condensation product and a pitch remaining from the distillation of fatty substances while in contact with an alkali.

6. An insulating material containing a phenolic condensation product and a pitch remaining from the distillation of fatty substances while in contact with an alkali and exhibiting a positive temperature resistance coefficient.

7. A flexible insulating material comprising a sheet of fibrous material impregnated with a composition containing a phenolic condensation product and stearin pitch dissolved in a common solvent.

In witness whereof I have hereunto set my hand this 18th day of November, 1910.

LAWRENCE E. BARRINGER.

Witnesses:
BENJAMIN B. HULL,
HELEN ORFORD.